United States Patent
Gottlieb et al.

(10) Patent No.: US 11,843,134 B2
(45) Date of Patent: Dec. 12, 2023

(54) POWER CONTROL SYSTEM FOR AN ELECTRIC VEHICLE INCLUDING SACRIFICIAL PROTECTION DEVICE

(71) Applicant: GM GLOBAL TECHNOLOGY OPERATIONS LLC, Detroit, MI (US)

(72) Inventors: Mark Daniel Gottlieb, West Bloomfield, MI (US); Venkata Prasad Atluri, Novi, MI (US); Madhusudan Raghavan, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/523,719

(22) Filed: Nov. 10, 2021

(65) Prior Publication Data

US 2023/0147014 A1  May 11, 2023

(51) Int. Cl.
  *H01M 50/583* (2021.01)
  *H01M 50/581* (2021.01)
  *H01H 85/02* (2006.01)

(52) U.S. Cl.
  CPC ...... *H01M 50/583* (2021.01); *H01H 85/0241* (2013.01); *H01M 50/581* (2021.01); *H01H 2085/025* (2013.01); *H01M 2200/103* (2013.01); *H01M 2220/20* (2013.01)

(58) Field of Classification Search
  CPC ............. H01M 50/583; H01M 50/581; H01M 2200/103; H01M 2220/20; H01H 85/0241; H01H 2085/025
  See application file for complete search history.

(56) References Cited

U.S. PATENT DOCUMENTS

| | | | |
|---|---|---|---|
| 2020/0180468 A1* | 6/2020 | Kang | H02J 1/08 |
| 2022/0057455 A1* | 2/2022 | Fasching | H01M 10/4228 |
| 2022/0311064 A1* | 9/2022 | Hwang | H01M 10/486 |

FOREIGN PATENT DOCUMENTS

EP    3618141 A1 *  3/2020  ............ B60L 3/0069

OTHER PUBLICATIONS

U.S. Appl. No. 17/562,567, filed Dec. 27, 2021, Atluri et al.

* cited by examiner

*Primary Examiner* — Brian R Ohara
*Assistant Examiner* — Emily Elizabeth Freeman
(74) *Attorney, Agent, or Firm* — Harness, Dickey & Pierce, P.L.C.

(57) ABSTRACT

A power control system for a battery system of a vehicle includes a first contactor, a second contactor, N fuses and N vehicle loads. An active sacrificial protection device includes a third contactor and a first fuse. The active sacrificial protection device is connected to a positive or negative terminal of the battery system. A current sensor is configured to sense a measured load current flowing through one of the first contactor and the second contactor. A battery management module is configured to selectively close the third contactor to reduce current flowing through one of the first contactor or the second contactor and selectively open the one of the first contactor or the second contactor after closing the third contactor.

20 Claims, 5 Drawing Sheets

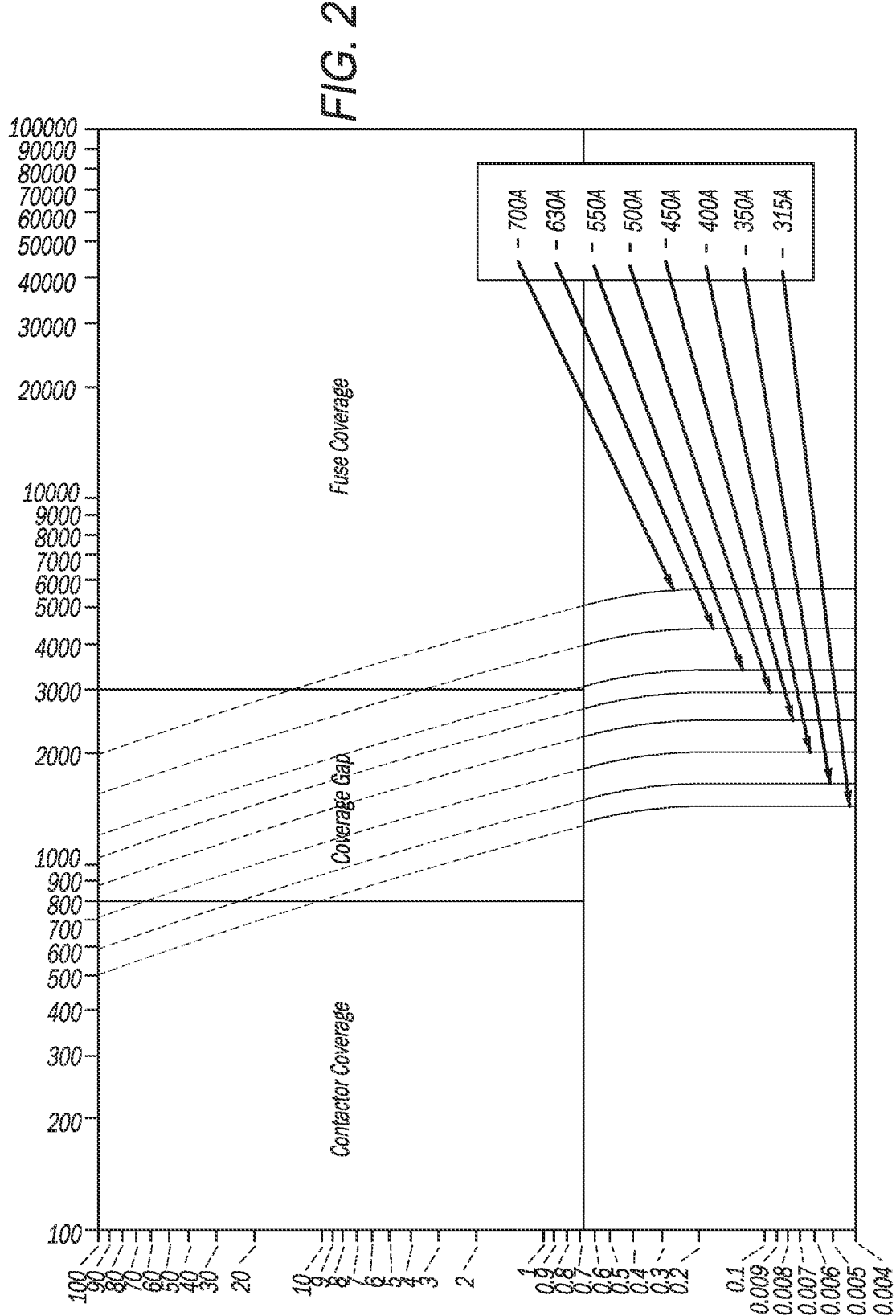

POWER CONTROL SYSTEM FOR AN ELECTRIC VEHICLE INCLUDING SACRIFICIAL PROTECTION DEVICE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to electric vehicles (EVs), and more particularly to power control systems for EVs.

Electric vehicles (EVs) include a battery system including one or more battery cells, modules and/or packs. The EV can be a battery electric vehicle (BEV), a fuel cell vehicle or a hybrid vehicle. A power control system is used to control charging and/or discharging of the battery system during charging and/or driving. During driving, one or more electric motors of the EV receive power from the battery system to provide propulsion for the vehicle and/or to return power to the battery system during regeneration.

EVs include power control systems to deliver power to the propulsion system and/or other vehicle loads. The power control systems are also designed to protect components such as the battery pack(s), DC-DC converter(s), power inverter(s), and motor(s). These systems typically include contactors and fuses that attempt to isolate the battery pack(s) from the propulsion loads and/or other vehicle loads in the event of unintended faults causing current large spikes. However, coordinating protection using the contactors and fuses is difficult due to coverage gaps. Furthermore, operating the contactors and fuses within a desired reaction time is also challenging.

SUMMARY

A power control system for a battery system of a vehicle includes a first contactor including a first terminal connected to a first terminal of the battery system. A second contactor including a first terminal connected to a second terminal of the battery system. N fuses each include a first terminal and a second terminal. The first terminal of the N fuses is connected to a second terminal of the first contactor, where N is an integer greater than zero. N vehicle loads Include first terminals connected to second terminals of the N fuses. An active sacrificial protection device including a third contactor and a first fuse. One of: a first terminal of the active sacrificial protection device is connected to the first terminal of the battery system and a second terminal is connected to the first terminals of the N fuses and the second terminal of the first contactor; or a first terminal of the active sacrificial protection device is connected to the second terminal of the battery system and a second terminal of the active sacrificial protection device is connected to second terminals of the N loads and the second terminal of the second contactor. A current sensor is configured to sense a measured load current flowing through one of the first contactor and the second contactor. A battery management module is configured to selectively close the third contactor to reduce current flowing through one of the first contactor or the second contactor; and selectively open the one of the first contactor or the second contactor after closing the third contactor.

In other features, the battery management module is configured to selectively close the third contactor in response to at least one of a fault current, battery state of health, battery state of charge and battery temperature. The battery management module is further configured to calculate an error current based the measured load current and a commanded total load current, and compare the error current to a first predetermined current threshold.

In other features, in response to the error current being greater than the first predetermined current threshold, the battery management module is further configured to compare the measured load current to a second predetermined current threshold.

In other features, in response to the measured load current being less than the second predetermined current threshold, the battery management module opens the one of the first contactor or the second contactor. In response to the measured load current being greater than the second predetermined current threshold, the battery management module compares the measured load current to a third predetermined current threshold.

In other features, in response to the measured load current being less than the third predetermined current threshold, the battery management module selectively closes the third contactor and opens the one of the first contactor or the second contactor in response to state of charge and temperature of the battery system.

In other features, a first one of the N vehicle loads comprises a motor and wherein a first one of the N fuses has a current rating that is larger than a current rating of the first fuse. The third contactor is normally open. The third contactor is normally closed.

A method for operating a power control system for a battery system of a vehicle includes connecting a first terminal of a first contactor to a first terminal of the battery system; connecting a first terminal of a second contactor to a second terminal of the battery system; connecting first terminals of N fuses to a second terminal of the first contactor, where N is an integer greater than zero; connecting first terminals of N vehicle loads to second terminals of the N fuses; connecting one of: a first terminal of the active sacrificial protection device is connected to the first terminal of the battery system and a second terminal is connected to the first terminals of the N fuses and the second terminal of the first contactor; or a first terminal of the active sacrificial protection device is connected to the second terminal of the battery system and a second terminal of the active sacrificial protection device is connected to second terminals of the N loads and the second terminal of the second contactor; sensing a measured load current flowing through one of the first contactor and the second contactor; detecting a fault current; selectively closing the third contactor to reduce current flowing through one of the first contactor or the second contactor; and selectively opening the one of the first contactor or the second contactor after closing the third contactor.

In other features, selectively closing the third contactor is performed in response to at least one of a fault current, battery state of health, battery state of charge and battery temperature. The method includes calculating an error current based the measured load current and a commanded total load current; and comparing the error current to a first predetermined current threshold.

In other features, in response to the error current being greater than the first predetermined current threshold, the method includes comparing the measured load current to a second predetermined current threshold. The method includes opening the one of the first contactor and the second contactor in response to the measured load current being less than the second predetermined current threshold. The method includes comparing the measured load current to a third predetermined current threshold in response to the measured load current being greater than the second predetermined current threshold.

In other features, in response to the measured load current being less than the third predetermined current threshold, the method includes selectively closing the third contactor and opening the one of the first contactor or the second contactor in response to state of charge and temperature of the battery system.

A power control system for a battery system of a vehicle includes a first contactor including a first terminal connected to a first terminal of the battery system. A second contactor includes a first terminal connected to a second terminal of the battery system. N fuses each include a first terminal and a second terminal. The first terminal of the N fuses is connected to a second terminal of the first contactor, where N is an integer greater than zero. N vehicle loads are connected to the second terminals of the N fuses. An active sacrificial protection device includes a third contactor and a first fuse, wherein one of a first terminal of the active sacrificial protection device is connected to the first terminal of the battery system and a second terminal is connected to the first terminals of the N fuses and the second terminal of the first contactor; or a first terminal of the active sacrificial protection device is connected to the second terminal of the battery system and a second terminal of the active sacrificial protection device is connected to second terminals of the N loads and the second terminal of the second contactor. A current sensor senses a measured load current flowing through one of the first contactor and the second contactor. A battery management module is configured to calculate an error current based on the measured load current and a commanded total load current and compare the error current to a first predetermined current threshold. In response to the error current being greater than the first predetermined current threshold, the battery management module compares the measured load current to a second predetermined current threshold. In response to the measured load current being greater than the second predetermined current threshold, the battery management module compares the measured load current to a third predetermined current threshold. In response to the measured load current being less than the third predetermined current threshold, the battery management module selectively closes the third contactor and opens the one of the first contactor or the second contactor in response to state of charge and temperature of the battery system.

In other features, a first one of the N vehicle loads comprises a motor and wherein a first one of the N fuses has a current rating that is larger than a current rating of the first fuse. The third contactor is normally open.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 2 is a graph illustrating an example of coverage using fuses and contactors and a coverage gap as a function of reaction time and fault current without an ASPD;

In the drawings, reference numbers may be reused to identify similar and/or identical elements.

DETAILED DESCRIPTION

Power control systems for electric vehicles include one or more main contactors. During normal operation of the vehicle, power flows through the one or more main contactors. When a current spike occurs (such as due to a short circuit), the power control system may be unable to open one of the main contactors due to the high current. In some situations, one or more of the main contactors can be fused into a closed position by the current spikes.

Power control systems for electric vehicles according to the present disclosure include one or more main contactors and an active sacrificial protection device (ASPD) including a sacrificial contactor and fuse. The contactor and the fuse of the ASPD are connected in parallel with one of the main contactors. In some examples, the contactor of the ASPD is normally open. In other examples, the contactor is normally open, normally closed or dynamically controlled.

The power control system detects fault currents such as current spikes intelligently and protects the battery pack(s) and other components by creating a current divider through the contactor and fuse of the ASPD. In other words, the contactor of the ASPD is closed (or opened) to provide an alternate pathway for current to travel to reduce current through one of the main contactors and allow the main contactor to be opened. Once the main contactor is opened, all of the current flows through the fuse of the ASPD. In some examples, the fuse of the ASPD is sized smaller than other fuses normally used for the main contactor and blows relatively quickly to open the circuit.

While the ASPD contactor can be closed in response to detection of fault current, the power control system may also close the ASPD contactor earlier (e.g. prior to detection of a fault current) in response to battery state of charge (SOC), battery state of health (SOH), and/or battery temperature.

Figure 1A:
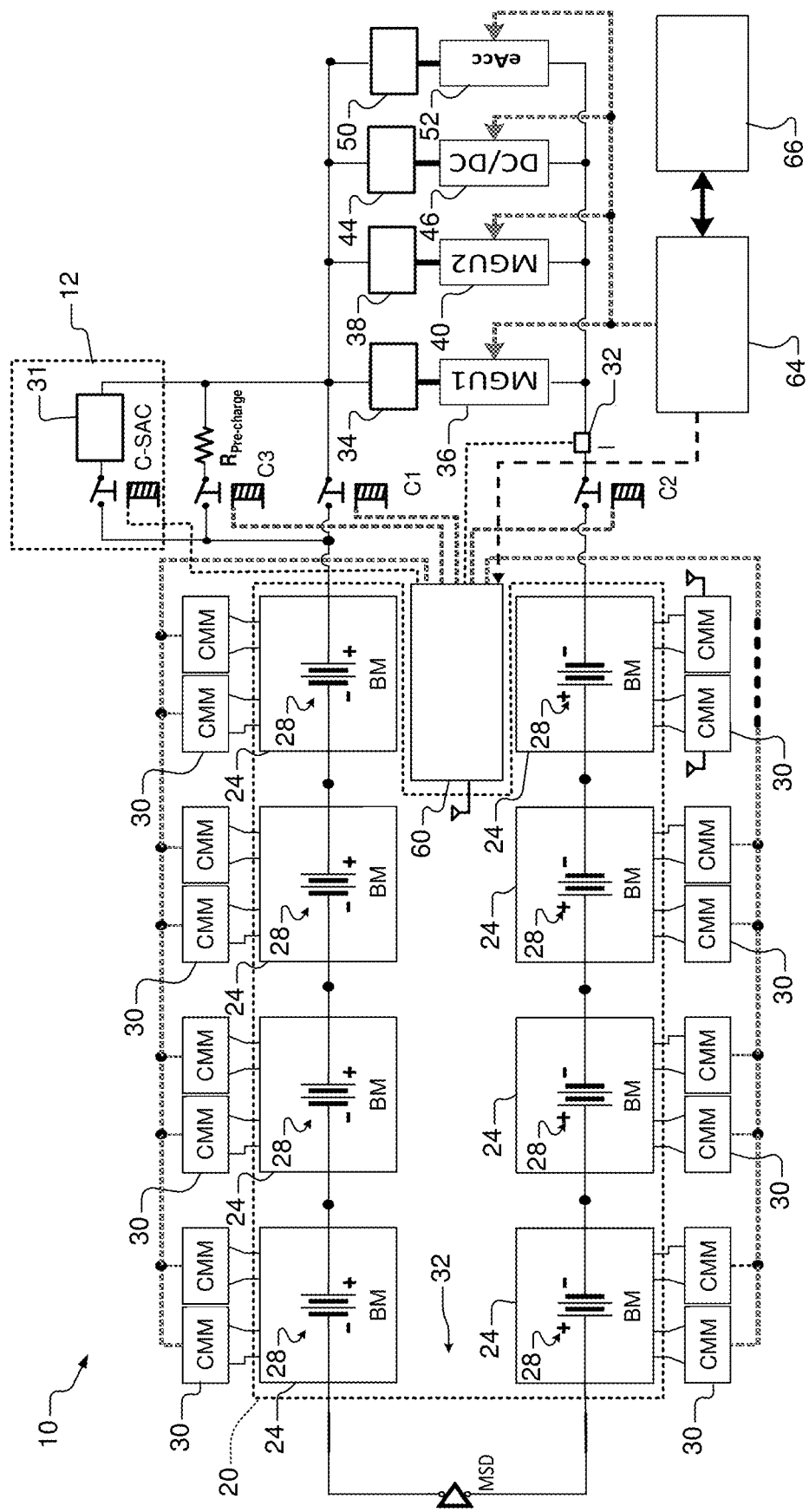
FIGS. 1A and 1B are functional block diagrams of examples of a power control systems for an electric vehicle including an active sacrificial protection device (ASPD) according to the present disclosure.
Figure 1B:
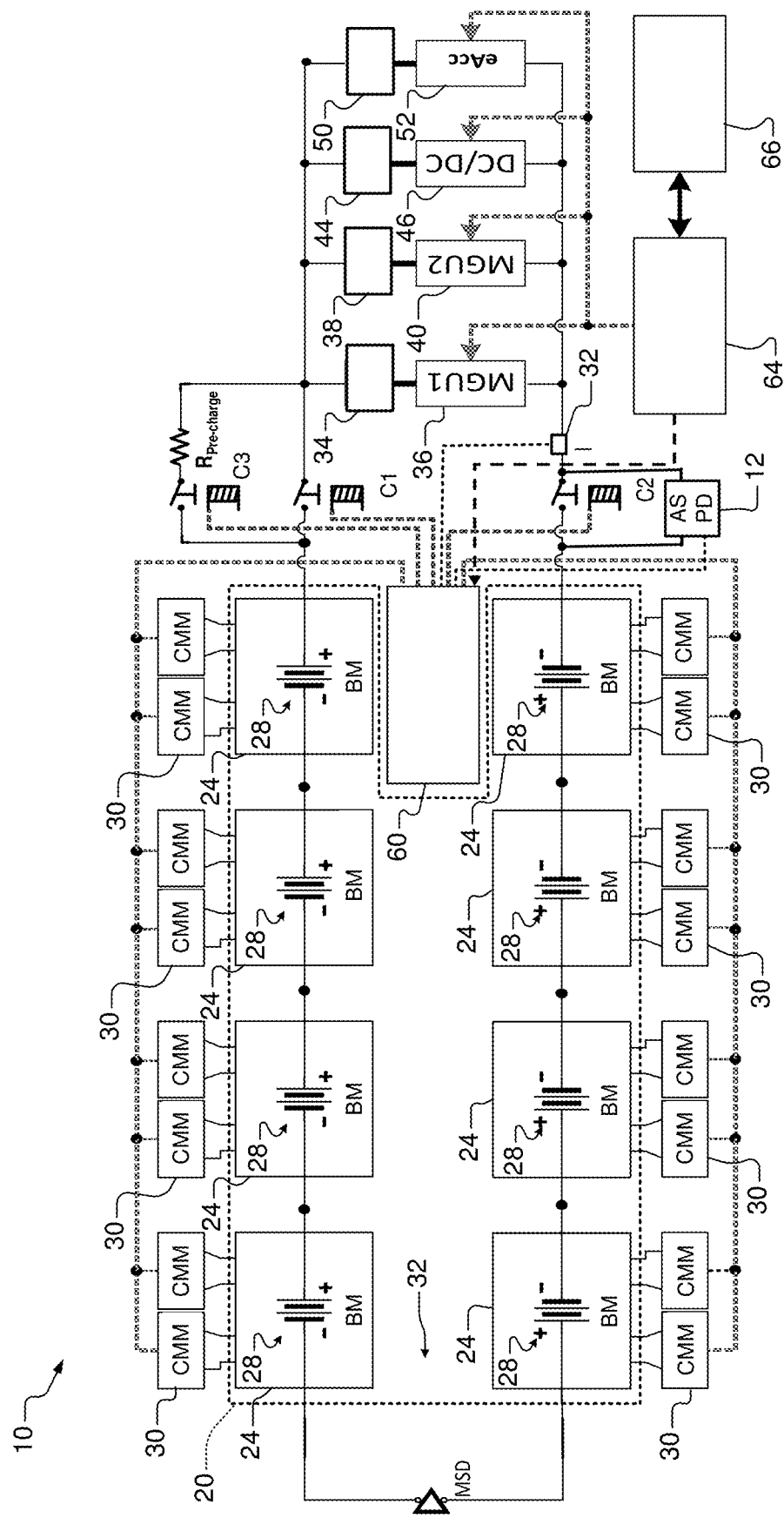

Referring now to FIGS. 1A and 1B, an example of a power control system 10 for a electric vehicle (EV) including an ASPD 12 is shown. In FIG. 1A, the ASPD 12 is connected in parallel with a contactor C1 connected to a positive terminal of a battery system 20.

In FIG. 1A, the power control system 10 includes the battery system 20 including one or more battery cells, modules and/or packs. In this example, the battery system 20 one or more battery packs each including N battery modules 24 (wherein N is an integer greater than one). Each of the N battery modules 24 includes M battery cells 28 (where M is an integer greater than one). For example, N may be equal to 8, M may be equal to 24 and the battery system 20 may provide high voltage (HV) such as 800V, although N and M can have other values and the voltage output of the one or more battery packs may vary.

Parameters of the M battery cells 28 of the N battery modules 24 are monitored by cell monitoring modules (CMM) 30. In some examples, each of the N battery modules 24 may include one or more of the CMMs 30 (for example, two are shown for each of the N battery modules 24). The CMMs 30 can be connected to the battery management module 60 (described below) using either wireless or wired connections. While the N battery modules 24 are connected in series in this example, the N battery modules 24 can be connected in series, parallel and/or combinations thereof.

A manual service disconnect (MSD) can be connected between one or more of the N battery modules 24. For example, an MSD 32 is connected between two groups of the N battery modules (e.g. between first and second groups each including four of the N battery modules 24 that are connected in series), although other configurations can be used.

A first terminal (e.g. a positive terminal) of the battery system 20 is connected to first terminals of a first contactor C1, a third contactor C3 and an ASPD contactor C-SAC. While the ASPD contactor C-SAC is shown as a normally open contactor, a normally closed contactor can be used. In other words, the ASPD contactor C-SAC can be operated as normally open, normally closed or dynamically controlled once the first contactor is closed.

A second terminal of the third contactor is connected to a first terminal of pre-charge resistor $R_{precharge}$. A second terminal of the ASPD contactor C-SAC is connected to a fuse 31. Second terminals of the first contactor C1, the pre-charge resistor $R_{precharge}$ and the fuse 31 are connected to first terminals of fuses 34, 38, 44 and 50. Second terminals of the fuses 34, 38, 44 and 50 are connected to first terminals of a first motor generator unit (MGU1) 36, a second motor generator unit (MGU2) 40, a DC-DC converter 46 and accessory loads 52, respectively.

A second terminal of one of the N battery modules 24 of another one of the battery packs 20 is connected to a first terminal of a second contactor C2. A second terminal of the second contactor C2 is connected to a first terminal of a current sensor 32. A second terminal of the current sensor 32 is connected to second terminals of the first motor generator unit (MGU1) 38, the second motor generator unit (MGU2) 40, the DC-DC converter 46 and the accessory loads 52.

A battery management module 60 communicates with the CMMs 30, the contactors (the first contactor C1, the second contactor C2, the third contactor C3 and the ASPD contactor C-SAC), a voltage control module (VCM) 64, and the current sensor 32. A driver demand module 66 determines driver demand and outputs parameters relating to driver demand to the VCM 64, which determines a voltage of the battery system. In some examples, driver demand is based in part on pedal position.

As will be described further below, the ASPD 12 monitors fault currents using the current sensor 32. While the ASPD contactor can be closed in response to detection of fault current in this example, the power control system may also close the ASPD contactor earlier (e.g. prior to detection of a fault current) in response to other parameters such as battery state of charge (SOC), battery state of health (SOH), and/or battery temperature.

When the fault current falls into predetermined limits (or the other conditions are used and met), the ASPD 12 creates an alternative path around the first contactor C1, which allows the first contactor C1 to be opened before the fuse 31 of the ASPD 12 blows. Once the fuse 31 is blown, the respective (in this example positive) side of the battery pack is disconnected from the vehicle loads to prevent further damage.

The ASPD contactor C-SAC and the fuse 31 provide an alternate current path to add an otherwise undersized fuse in series with the existing short circuit. The alternate path prevents fusing of the first contactor C1 while opening under an otherwise overload condition. In some examples, the fuse 31 is sized smaller (e.g. it has a lower maximum current rating and/or shorter withstand duration) than the other fuses in the system such that the fuse 31 blows shortly after the ASPD contactor C-SAC is closed and the first contactor C1 is opened. In other words, the ASPD contactor C-SAC and the fuse 31 are sized so that they last long enough for the first contactor C1 to open based on operating regions.

In FIG. 1B, the ASPD 12 is connected in parallel with the contactor C2 connected to a negative terminal of the battery system 20. When the fault current falls into predetermined limits, the ASPD 12 creates an alternative path around the second contactor C2, which allows the second contactor C2 to be opened before the fuse 31 of the ASPD 12 blows. Once the fuse 31 is blown, the respective (in this example negative) side of the battery pack is disconnected from the vehicle loads to prevent further damage.

Figure 4:
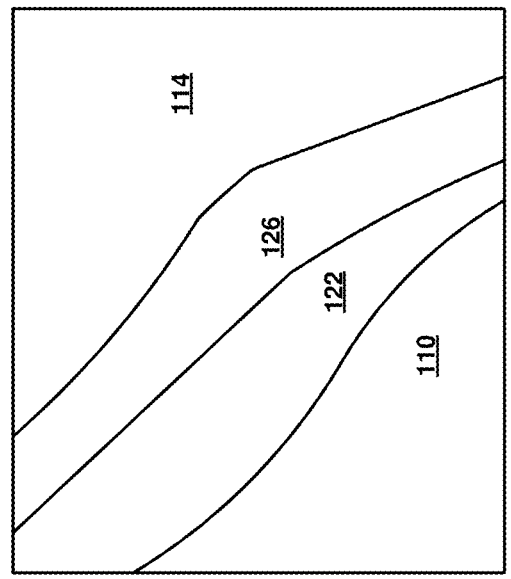
FIG. 4 is a graph illustrating an example of coverage using fuses and contactors and a coverage gap as a function of state of charge and temperature when using the power control system including the ASPD according to the present disclosure.
Figure 3:
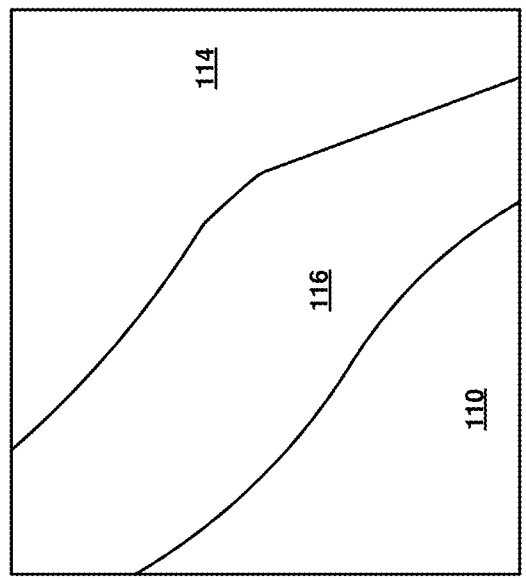
FIG. 3 is a graph illustrating an example of coverage using fuses and contactors and a coverage gap as a function of state of charge and temperature.

Referring now to FIGS. 2-4, coverage of current by the contactors and fuses and a coverage gap are shown for systems without the ASPD (FIGS. 2 and 3) and with the ASPD (FIG. 4). In FIG. 3, an example of coverage using contactors (area 110) and fuses (area 114) and a coverage gap (area 116) are shown as a function of state of charge (SOC) and temperature without the ASPD 12.

In FIG. 4, an example of coverage using contactors (area 110), fuses (area 114), the ASPD (area 122) and a coverage gap (area 126) are shown as a function of SOC and temperature with the ASPD 12. While SOC and temperature are shown, other parameters indicative of SOC or temperature can be used.

Figure 5:
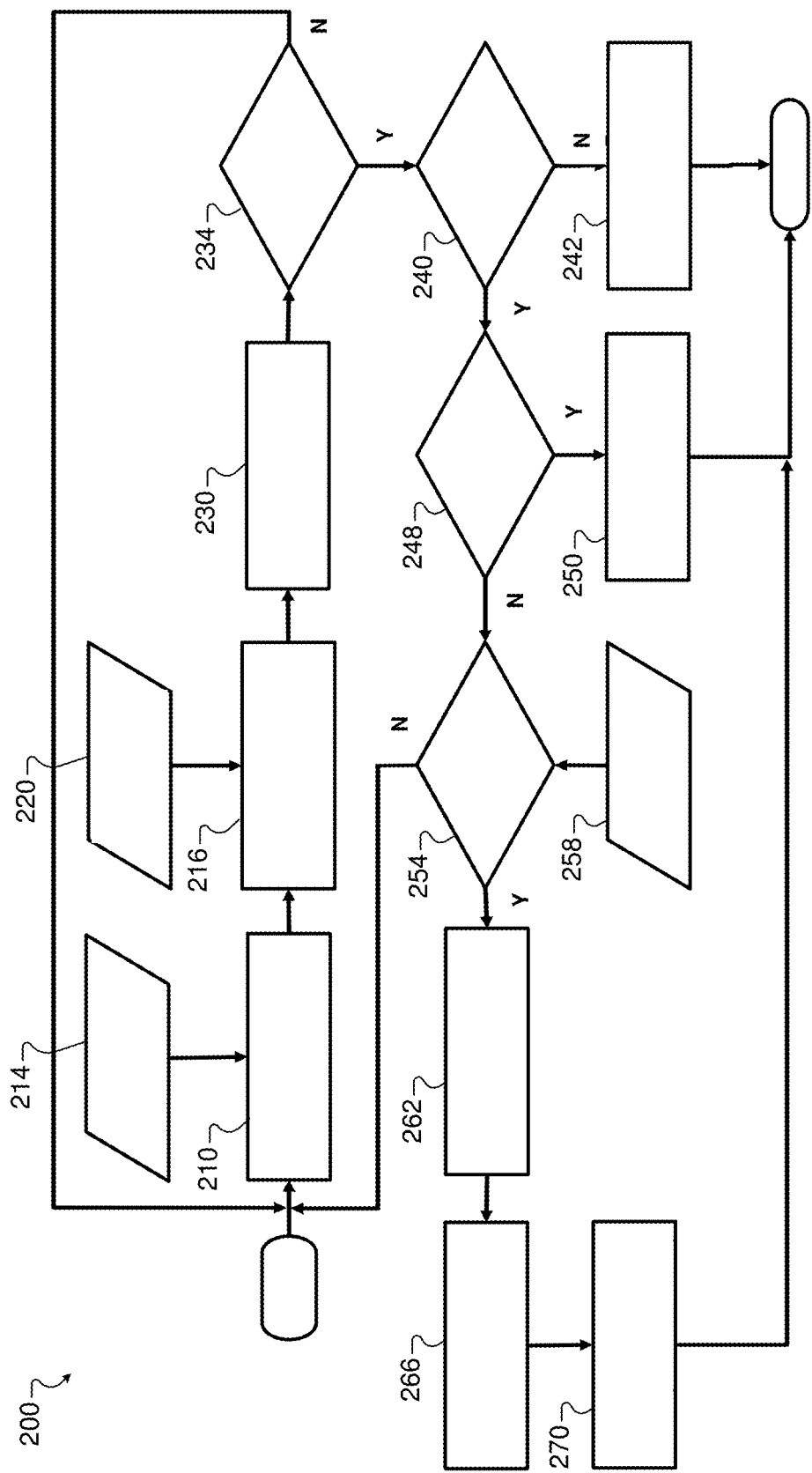
FIG. 5 is a flowchart of an example of a method for controlling the ASPD according to the present disclosure.

Referring now to FIG. 5, a method 200 for controlling an ASPD is shown for the case where the ASPD of FIG. 1A is used. At 210 and 214, the method measures load current $I_{act}$ using the current sensor 32. At 216 and 220, the method calculates commanded total load current $I_{cmd}$. The commanded total load current $I_{cmd}$ is based on driver demand, demand from other vehicle loads, etc.

At 230, the method calculates the error current $I_{err} = I_{act} - I_{cmd}$. At 234, the method determines whether the error current $I_{err}$ is greater than a current threshold $I_{TH}$. If 234 is false, the method returns to 210. If 234 is true, the method continues at 240 and determines whether $I_{act}$ is greater than a maximum amplitude of the first contactor C1. In some examples, the maximum amplitude of the first contactor C1 may correspond to a line between areas 110 and 122 in FIG. 4.

If 240 is false, the method opens the first contactor at 242. If 240 is true, the method continues at 248 and determines whether $I_{act}$ is greater than a minimum amperage of the fuse. In some examples, the minimum amperage of the fuse corresponds to a line between areas 126 and 114 in FIG. 4. If 248 is true, the method continues at 250 and takes no action (allowing the main fuse to blow). If 248 is false, the method continues at 254 and determines whether conditions support operation of the ASPD (e.g. ASPD area 122). In some examples, this determination is made by indexing an ASPD operational lookup table 258 such as the one shown in FIG. 5 using SOC and temperature. While FIG. 4 shows SOC and temperature, other parameters indicative of SOC and temperature can be used.

If 254 is false, the method returns to 210. No action is taken since operation is in the coverage gap area 126. If 254 is true, the method continues at 262 and closes the sacrificial contactor C-SAC. Closing of the sacrificial contactor C-SAC creates a current divider using the ASPD 12 to reduce the current through the first contactor C1.

At 266, the first contactor C1 is opened (in part due to the reduced current through the first contactor C1). At 270, current flowing through the fuse 31 causes the fuse 31 to blow, which opens the circuit.

As can be appreciated, the systems and methods described herein detect a short circuit when operating in the coverage gap region. The ASPD contactor C-SAC is closed, the first contactor C1 (in parallel with ASPD contactor) can be opened and the fuse 31 of the ASPD 12 blows to open the circuit. The ASPD contactor C-SAC and the fuse 31 are sized so that they last long enough for first contactor C1 to be opened based on operating regions. In some examples, a period including the closing of the ASPD contactor C-SAC, opening the first contactor C1 and blowing of the fuse 31 takes about 50 milliseconds (ms), although shorter or longer periods can be used.

The ASPD 12 provides an alternate current path through an undersized fuse (the fuse 31) connected in series with the existing short circuit. The alternate path prevents fusing of main contactor while opening under an otherwise overload condition. As can be appreciated, while the foregoing description shows the ASPD contactor C-SAC and the fuse 31 in series with the first contactor C1 on the positive side of the battery pack, the ASPD contactor C-SAC and the fuse 31 can be connected in parallel with the second contactor C2 on the negative side of the battery pack. Operation of the ASPD 12 is independent and non-reliant on operation of the third contactor C3 and the pre-charge resistor R.

In some examples, if no coverage gap exists or acceptable coverage gap exists (and one of the fuses blows, the sacrificial contactor can be used to connect the remaining auxiliary loads with intact fuses. This approach can be used to power emergency lights, a chiller, and/or other vehicle loads.

While the ASPD contactor can be closed in response to detection of fault current, the power control system may also close the ASPD contactor earlier (e.g. prior to detection of a fault current) in response to battery state of charge (SOC), battery state of health (SOH), and/or battery temperature.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A power control system for a battery system of a vehicle, comprising:
   a first contactor including a first terminal connected to a first terminal of the battery system;
   a second contactor including a first terminal connected to a second terminal of the battery system;
   N fuses each including a first terminal and a second terminal, wherein the first terminal of the N fuses is connected to a second terminal of the first contactor, where N is an integer greater than zero;
   N vehicle loads having first terminals connected to second terminals of the N fuses;
   an active sacrificial protection device including a third contactor and a first fuse, where one of:
   a first terminal of the active sacrificial protection device is connected to the first terminal of the battery system and a second terminal of the active sacrificial protection device is connected to the first terminals of the N fuses and the second terminal of the first contactor;
   or the first terminal of the active sacrificial protection device is connected to the second terminal of the battery system and the second terminal of the active sacrificial protection device is connected to second terminals of the N vehicle loads and a second terminal of the second contactor;
   a current sensor configured to sense a measured load current flowing through one of the first contactor and the second contactor; and
   a battery management module configured to:
   selectively close the third contactor to reduce current flowing through one of the first contactor or the second contactor; and
   selectively open the one of the first contactor or the second contactor after closing the third contactor.

2. The power control system of claim 1, wherein the battery management module is configured to selectively close the third contactor in response to at least one of a fault current, battery state of health, battery state of charge, and battery temperature.

3. The power control system of claim 1, wherein the battery management module is further configured to:
   calculate an error current based the measured load current and a commanded total load current, and
   compare the error current to a first predetermined current threshold.

4. The power control system of claim 3, wherein, in response to the error current being greater than the first predetermined current threshold, the battery management module is further configured to compare the measured load current to a second predetermined current threshold.

5. The power control system of claim 4, wherein in response to the measured load current being less than the second predetermined current threshold, the battery management module opens the one of the first contactor or the second contactor.

6. The power control system of claim 4, wherein in response to the measured load current being greater than the second predetermined current threshold, the battery management module compares the measured load current to a third predetermined current threshold.

7. The power control system of claim 6, wherein in response to the measured load current being less than the third predetermined current threshold, the battery management module selectively closes the third contactor and opens the one of the first contactor or the second contactor in response to state of charge and temperature of the battery system.

8. The power control system of claim 1, wherein a first one of the N vehicle loads comprises a motor and wherein a first one of the N fuses has a current rating that is larger than a current rating of the first fuse.

9. The power control system of claim 1, wherein the third contactor is normally open.

10. The power control system of claim 1, wherein the third contactor is normally closed.

11. A method for operating a power control system for a battery system of a vehicle, the method comprising:
   connecting a first terminal of a first contactor to a first terminal of the battery system;

connecting a first terminal of a second contactor to a second terminal of the battery system;
connecting first terminals of N fuses to a second terminal of the first contactor, where N is an integer greater than zero;
connecting first terminals of N vehicle loads to second terminals of the N fuses;
providing an active sacrificial protection device;
connecting one of:
- a first terminal of the active sacrificial protection device to the first terminal of the battery system and a second terminal to the first terminals of the N fuses and the second terminal of the first contactor; or
- the first terminal of the active sacrificial protection device to the second terminal of the battery system and the second terminal of the active sacrificial protection device is connected to second terminals of the N loads and a second terminal of the second contactor;

sensing a measured load current flowing through one of the first contactor and the second contactor;
detecting a fault current;
selectively closing a third contactor of the active sacrificial protection device to reduce current flowing through one of the first contactor or the second contactor; and
selectively opening the one of the first contactor or the second contactor after closing the third contactor.

12. The method of claim 11, wherein selectively closing the third contactor is performed in response to at least one of a fault current, battery state of health, battery state of charge, and battery temperature.

13. The method of claim 11, further comprising:
calculating an error current based the measured load current and a commanded total load current;
comparing the error current to a first predetermined current threshold;
in response to the error current being greater than the first predetermined current threshold, comparing the measured load current to a second predetermined current threshold; and
opening the one of the first contactor and the second contactor in response to the measured load current being less than the second predetermined current threshold.

14. The method of claim 13, further comprising:
comparing the measured load current to a third predetermined current threshold in response to the measured load current being greater than the second predetermined current threshold; and
in response to the measured load current being less than the third predetermined current threshold selectively closing the third contactor and opening the one of the first contactor or the second contactor in response to state of charge and temperature of the battery system.

15. The power control system of claim 1, wherein the battery management module is configured to:
calculate an error current based on the measured load current and a commanded total load current and compare the error current to a first predetermined current threshold;
in response to the error current being greater than the first predetermined current threshold, compare the measured load current to a second predetermined current threshold;
in response to the measured load current being greater than the second predetermined current threshold, compare the measured load current to a third predetermined current threshold; and
in response to the measured load current being less than the third predetermined current threshold, selectively close the third contactor and open the one of the first contactor or the second contactor in response to state of charge and temperature of the battery system.

16. The power control system of claim 15, wherein a first one of the N vehicle loads comprises a motor and wherein a first one of the N fuses has a current rating that is larger than a current rating of the first fuse.

17. The power control system of claim 15, wherein the third contactor is normally open.

18. The power control system of claim 1, wherein the battery management module is configured to selectively close the third contactor to reduce the current flowing through the one of the first contactor or the second contactor based on the measured load current sensed by the current sensor.

19. The power control system of claim 1, wherein the active sacrificial protection device is at least one of i) upstream from the N fuses, and ii) supplies power to the N fuses.

20. The power control system of claim 1, wherein the active sacrificial protection device is connected in parallel with the first contactor.

* * * * *